United States Patent [19]

Eggleston et al.

[11] Patent Number: 5,771,353
[45] Date of Patent: Jun. 23, 1998

[54] SYSTEM HAVING VIRTUAL SESSION MANAGER USED SESSIONLESS-ORIENTED PROTOCOL TO COMMUNICATE WITH USER DEVICE VIA WIRELESS CHANNEL AND SESSION-ORIENTED PROTOCOL TO COMMUNICATE WITH HOST SERVER

[75] Inventors: Gene Eggleston, Cary; Mitch Hansen, Fox River Grove, both of Ill.

[73] Assignee: Motorola Inc., Schaumburg, Ill.

[21] Appl. No.: 557,657

[22] Filed: Nov. 13, 1995

[51] Int. Cl.[6] .................................................. G06F 13/00
[52] U.S. Cl. ............................... 395/200.57; 395/200.58
[58] Field of Search ............................ 395/182.02, 675, 395/680, 200.57, 200.58; 380/30; 379/34

[56] References Cited

U.S. PATENT DOCUMENTS

| 5,018,097 | 5/1991 | Kuhlmann et al. ...................... 395/680 |
| 5,276,680 | 1/1994 | Messenger ............................... 370/311 |
| 5,287,456 | 2/1994 | Rhodes et al. ...................... 395/200.01 |
| 5,335,276 | 8/1994 | Thompson et al. ........................ 380/21 |
| 5,351,235 | 9/1994 | Lahtinen .................................. 370/259 |
| 5,406,557 | 4/1995 | Baudoin .................................. 370/463 |
| 5,410,543 | 4/1995 | Seitz et al. .............................. 370/463 |
| 5,438,611 | 8/1995 | Campana, Jr. et al. ................ 455/412 |
| 5,526,358 | 6/1996 | Gregerson et al. .................... 370/94.3 |
| 5,526,483 | 6/1996 | French et al. ...................... 395/182.02 |
| 5,579,371 | 11/1996 | Aridas et al. ............................. 379/34 |
| 5,588,060 | 12/1996 | Aziz ......................................... 380/30 |
| 5,590,328 | 12/1996 | Seno et al. .............................. 395/675 |

*Primary Examiner*—Thomas C. Lee
*Assistant Examiner*—Le Hien Luu
*Attorney, Agent, or Firm*—J. Ray Wood

[57] ABSTRACT

A communication system includes a virtual session manager (225) for establishing and maintaining a sessionless communication path with a user device (201) on the one hand and a session-oriented communication path with a host system (231). The session-oriented connection with the host system permits normal access to, e.g., LAN-based applications, while the virtual session between the virtual session manager and user permits this access to be carried out remotely without the expense of a dedicated/circuit-switched or other session-oriented connection.

19 Claims, 2 Drawing Sheets

SYSTEM HAVING VIRTUAL SESSION MANAGER USED SESSIONLESS-ORIENTED PROTOCOL TO COMMUNICATE WITH USER DEVICE VIA WIRELESS CHANNEL AND SESSION-ORIENTED PROTOCOL TO COMMUNICATE WITH HOST SERVER

FIELD OF THE INVENTION

The present invention relates to communications and more particularly an improved method and apparatus for communicating data in a communications system.

BACKGROUND

The last 10 years have seen a tremendous increase in the demand for communications services, including both wired and wireless networks capable of handling data communications. Unlike voice services, such as standard telephony or cellular wireless services, in which circuit-switched communications are used because of the sensitivity of users to the timing of oral dialogue, greater efficiencies can often be achieved in data communications through the use of packet-switched or hybrid communications systems. This is particularly the case with communications to remote users (e.g., persons sending messages via one of the well-known available wireless networks like GSM (Global System for Mobiles) or AMPS (Advanced Mobile Phone System) cellular), where protracted circuit-switched sessions into a mail server or LAN (local area network) could be prohibitively expensive due to the high per-minute session charges by the wireless service provider.

One solution to this problem has been for users to limit, as much as feasible, their communications to session-less communications. This can be done, e.g., by subscribing to additional email services that can receive LAN/WAN (wide area network) email and send out broadcast pages and transmissions to registered users, in lieu of requiring a user to maintain a session with a mail server. However, this disadvantageously requires subscription to an additional service, and is typically limited in the types of applications supported. With the rapid growth in emerging sessionoriented applications—like the popular client server application of Lotus Notes®—the need is growing for more cost effective solutions to providing connectivity of such session-oriented applications and users remotely located from their host servers.

There remains therefore a need for an improved means for data communications that solves these and related problems.

DETAILED DESCRIPTION

These problems and others are solved by the improved method according to the invention. A presently preferred embodiment of the invention is a system including a virtual session manager (VSM) for establishing and maintaining a sessionless communication path with a first data processing device (e.g., a mobile client) on the one hand and a session-oriented communication path with a second data processing device (e.g., a host system). The session-oriented communication protocol with the host system permits remote access to, e.g., LAN-based applications, while the virtual session, via a sessionless-oriented communication protocol, between the VSM and remote client permits this access to be carried out without the expense of a dedicated/circuit switched connection.

Figure 1:
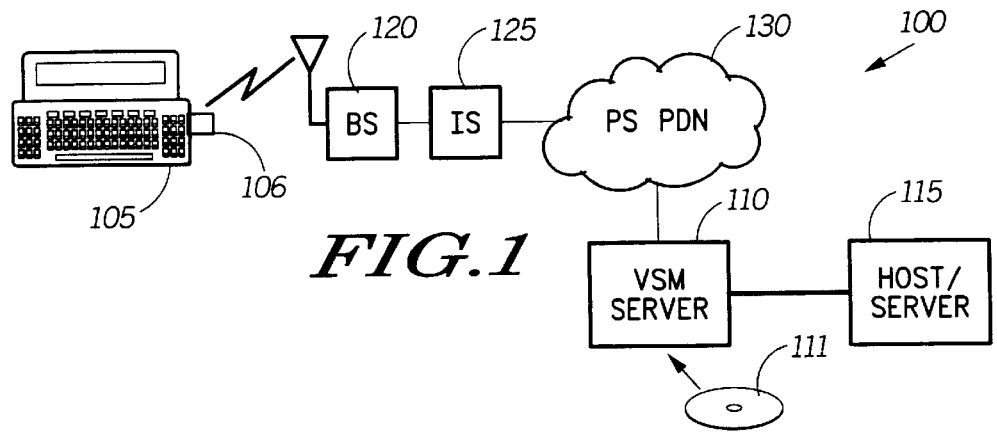
FIG. 1 is a block diagram of a communications system according to a first embodiment of the invention.

Turning now to FIG. 1, there is generally depicted a communication system 100 in accordance with a first embodiment of the invention. This system is configured to support one or more user devices such as wireless subscriber units (i.e., mobile station (MS) 105) communicating with host processor 115 via an infrastructure including base station 120 and intermediate system 125 coupled to a data network 130. In the illustrated case mobile station 105 is a portable computer having an rf (radio frequency) modem 106. A virtual session manager 110 is coupled between the public data network 130 and the host server 115. The virtual session manager is, preferably, an appropriately configured data processing device such as a communications server, the VSM program being shipped for loading on the server 110 via any convenient means such as a machine-readable CD-ROM 111 (compact disc-read only memory) or the like.

In this embodiment the mobile user 105 communicates with the VSM 110 using any appropriate data protocol being used by the data network 130, as necessarily modified for transport over the wireless infrastructure; the wireless infrastructure could be, e.g., any private system like ARDIS® or DataTAC®, CDPD (cellular digital packet data), GPRS (GSM Packet Radio Service), and the like. Thus, a sessionless data flow between the mobile user 105 and VSM 110 occurs on an event driven basis, and no costly connection is maintained when there is nothing being communicated. In order to keep connectivity costs to a minimum, the VSM 110 server is preferably connected to the LAN/WAN on which the host 115 is also connected, via any standard LAN/WAN communication channel (e.g., a bus or backbone). This allows the VSM 110 to advantageously maintain the same session with the host 115 that the client 105 typically enjoys when connected to the LAN/WAN. Thus, by use of the VSM 110 the client 105 can achieve a virtual session with the host 115 with almost the same access as if directly connected to the host's 115 LAN, but at a substantial reduction in the cost of communicating via the wireless network and PDN 130.

Figure 2:
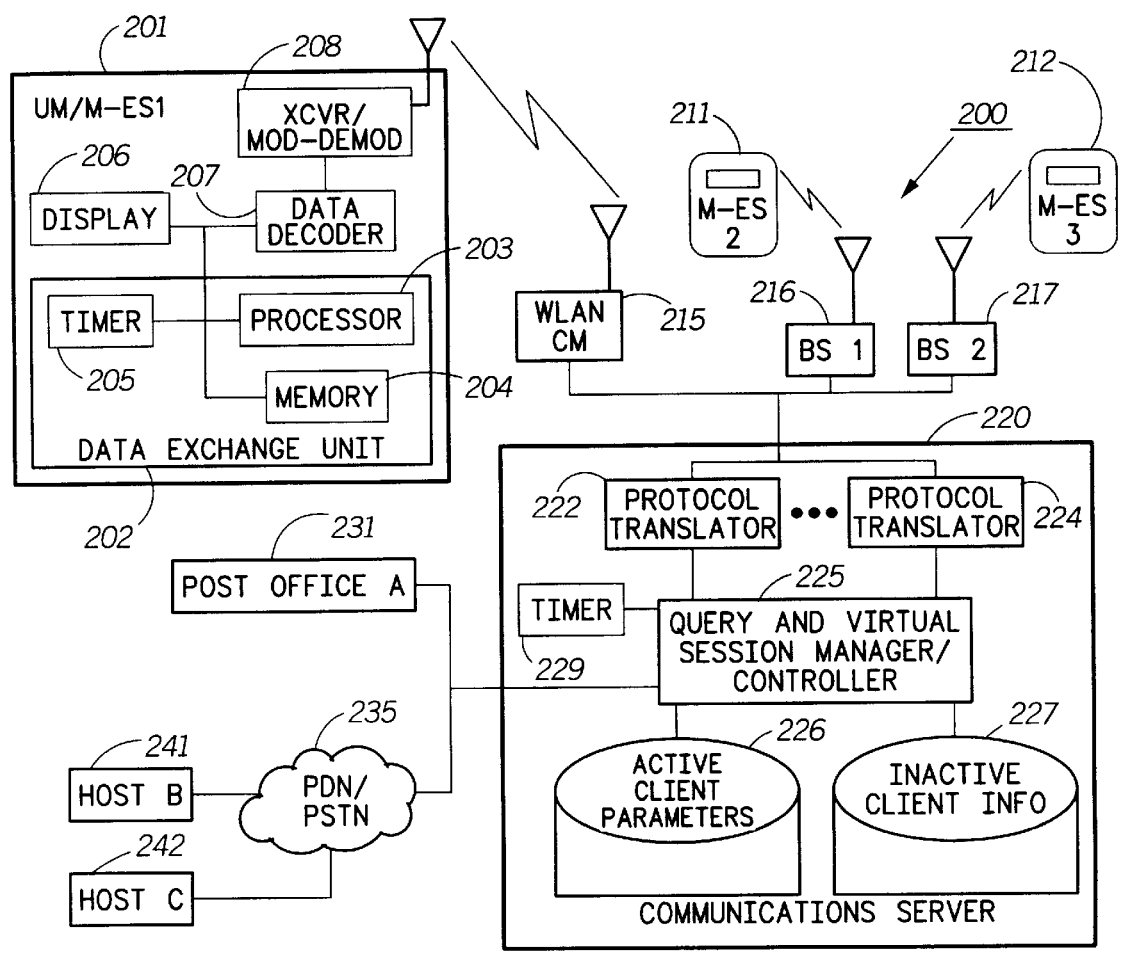
FIG. 2 is a block diagram of a communications system according to a further embodiment of the invention.

FIG. 2 illustrates an alternative communication system 200 embodiment of the present invention. A first client, a mobile end system (M-ES 1) computer including a user device 201, is in communication with a control module 215 of a wireless LAN (WLAN). This WLAN is coupled, e.g., on the same LAN or via bridges/routers, to a communications server 220 which includes VSM 225. An electronic mail (email) post office is coupled locally to VSM 225, either as another program running on the same communications server 220 or located on another server of the communications server's 220 LAN/WAN. It is not important, however, where the post office is located for purposes of operation of the VSM 225, as is illustrated by other application hosts B and C 241, 242 being in communication via other networks such as a public data network or public switched telephone network 235. In fact, the same user 201 could be concurrently coupled via the VSM 225 to, for example, a local email post office 231, a remote client-server host 241, a further database host server 242, a multimedia host, a voice processor, etc. It should be understood that for purposes of this application, a first device or component is responsive to or in communication with a second unit or component regardless of whether the first and second units are directly coupled or indirectly coupled, such as via intermediate units, including switches that operatively couple the units for only a segment of time, as long as a signal path can be found that directly or indirectly establishes a relationship between the first and second units. For example, the client computer 105 is in communication with the VSM server 110 even though intermediate system (e.g., a router or switch) 125 and a packet network 130 having multiple switches etc. are disposed between the user device 105 and VSM server 110.

In the illustrated case client 201 includes a data exchange unit 202, which in simple form could be an appropriately programmed electronic processor 203 (e.g., a general purpose CPU (central processing unit) and memory or data store 204. A timer 205 is also preferably employed in the data exchange control process, as will be explained further in connection with the flow chart of FIG. 3 below. A typical client 201 would also include some form(s) of user interface such as display 206, a data encoder/decoder 207 to accommodate the system communications protocol(s), and a transceiver (if using rf or infrared communications) and a modulator-demodulator (or modem) 208 to connect to a wireless or wireline communications network. Transceiver/modem 208 in this case would either include a built-in or attached user module for WLAN communications; the specific type will vary depending on the system, e.g., including PCMCIA (personal computer memory card interface association) wireless modems, and attached or built-in PSTN (public switched telephone network) modem, etc.

The communications server 220 preferably includes the VSM 225, memory stores for active client/user parameters and inactive client information 226 and 227, a timer 229, and optionally some form of protocol translators or formatters 222 . . . 224. The VSM 225 serves to manage the virtual session with the client 201 and session with host systems 231, 241 and/or 242 based on the parameters loaded into the active user parameter memory 226 or object. Controller 225 can also include a query manager for controlling specific processes, e.g., sending messages to a post office to query for unprocessed messages and forwarding received messages etc. The protocol translators serve to format or code the messages as appropriate for transport between the VSM 225 and client 201; these include, e.g., appropriate protocol software that can be located at the communications server, or any other convenient processor per design of the given communication system.

Communications server 220 is also illustrated as supporting additional users 211 and 212 communicating via different base stations 216, 217 coupled via a common bus, backbone, etc. These base stations can be part of the same communication system, or even different systems. Thus, for example, a single communications server can support at one local region an ARDIS® node, a RAM® node, a WLAN controller module, a CDPD node, an in-building cordless telephone node, etc., allowing users from a variety of systems to access the same communications server and post office. Users not registered could access through the appropriate one of these nodes along the model of FIG. 1, i.e., via PDN 235 to a remote communications server having their VSM. Thus, any number of system configurations is possible, limited only by the network services provided and the user's preference.

Figure 3:
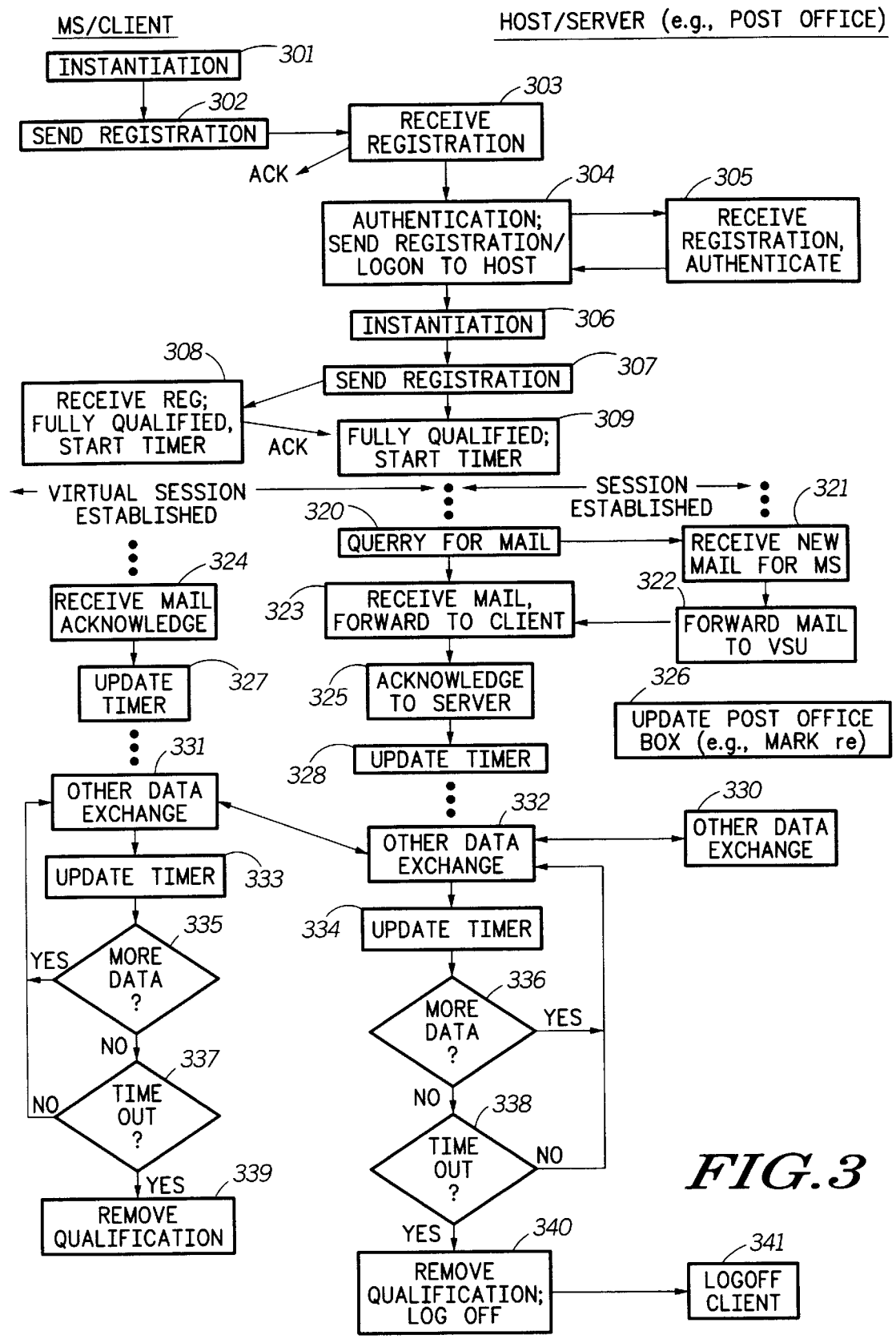
FIG. 3 is a flow chart illustrating messaging between the different functional entities of the wireless communications system of FIG. 1.

A process by which a VSM manages communications between client and host is illustrated in the flow chart embodiment of FIG. 3. This process typically begins with a user event, such as instantiation (forming) of a communications object at the client and sending a registration message (steps 301–302). Alternatively, the infrastructure could initiate the communications by sending a page or the like requesting the client to register (for example, when the client has registered with the wireless system but not yet requested registration with the communications server). In any event, once a registration message is received by the communications server, it preferably authenticates and otherwise qualifies the client, including sending a logon/registration message to the host for its authentication of the client (steps 303–305). Upon successful authentication, the communications server instantiates a communications session object (CSO) including client parameters retrieved from an inactive client parameter store, as modified by the user in his registration or subsequent messages (step 306). These parameters include at a minimum client and host identifiers, but may also include additional preferences based on the type of communications involved. Also, the registration and authentication process can be handled by the VSM, or alternatively by another appropriately programmed entity of the communications server. Following instantiation at the server, a response message, e.g., a further registration message, is sent to the client, and an acknowledgment (ACK) returned to the server; both client and server then retain the instantiated objects as fully qualified, and start session timers (steps 307–309). At this point a virtual session has been established between the client and the VSM, and a regular session established between the VSM and host computer. If the registration is not successful, then any instantiated object is deleted, with the client returned to an inactive status.

Upon establishing the virtual session, a query is preferably generated by a query manager requesting unprocessed data for the user, and the VSM forwards the query to the host (step 320). In the case of email, e.g., this might include generating a request message for all unread mail in the users post office box. The post office then checks for new mail received, and forwards all such mail to the VSM (steps 321–322). Because the VSM has established a LAN session with the post office, these communications are performed relatively quickly, e.g., in accordance with the LAN's and host's typical processing for their current loading level. The VSM in turn forwards the data (i.e., mail) received via the virtual session transport (step 323). For example, in the case of FIG. 1 where PDN 130 is an ISDN (integrated services digital network) network connected to a CDPD wireless network, the mail would be appropriately packetized by the communications server and delivered via the serving BS 120 according to ISDN/CDPD system protocols. This can take up to several minutes or more for a moderately sized mail package. However, since the data is being delivered in a sessionless mode, the amount of time the communication channel (including the more expensive wireless communication channel portion, as well as the portion via PDN 130) is tied up is kept to a minimum. This also translates into a significant cost savings for the user, since the user is only charged on a per packet basis for mail when it is actually transported, and doesn't have to pay for a prolonged session to keep connected to the post office in order to receive new mail. Finally, upon receipt by the client, appropriate acknowledgments are sent and the post office box updated, e.g., by marking the mail as read or processed (steps 324–326)

While in some systems it may be advantageous to store some of the data at the communications server, in the case of email and the like it is presently envisioned that the communication server is preferably used in maintaining the sessions between client and host, and not as a remote server for the host. Thus, rather than have all new data from the host pushed down to the communications server, most data exchanges are preferably initiated, at some predetermined interval or intervals, by the communications server (e.g., by the query manager).

Further, it is an inefficient use of resources to continue querying a host or attempting to deliver data when the client is no longer receiving at its remote location (occurring, e.g., when the client leaves a coverage area, or the user turns off its modem or processor). Thus, a process for either maintaining the client in an active status, or removing the client from active status in response to an event, is also preferably included in the VSM. One such process is to utilize timers at both client and VSM to determine when a virtual session is no longer active. The timers are first set upon registration, and are subsequently reset after each data exchange (steps 327–336). If no data exchange occurs within a predetermined period of time, say 20 minutes, both client and VSM would remove the client qualification (i.e., destroy the communication session object) and, if desired, mark the client as being in an inactive status (steps 337–340). The VSM would also forward a logoff message to the host (step 341). In order to avoid an undesired time out, the client is preferably configured to send a short message after a predetermined period since the last data exchange, sufficiently prior to the time at which the timers elapse so that the VSM can receive it. Otherwise, if there are only intermittent data exchanges, the client may be required to frequently re–register; this in turn means the client will not be notified of outbound data until the client re-registers and is again coupled via the virtual session manager.

One skilled in the art will appreciate that there are many variations that are possible for the present invention, only a limited number of which have been described in detail above. Thus, for example, while the embodiments above describe application to clients communicating in certain systems, one should appreciate that it has application to any communication system, wired or wireless, in which the user is remote from the host. It can also be used with almost any application program (e.g., transferring database, wordprocessing, graphics, voice etc. files, executing programs and control messages, etc.), not just email. Moreover, while processor 203, VSM controller 225, timers 205 and 229, data stores 204, 226 and 227, and other circuits, are described in terms of specific logical/functional/circuitry relationships, one skilled in the art will appreciate that such may be implemented in a variety of ways, preferably by appropriately configured and programmed processors, ASICs (application specific integrated circuits), and DSPs (digital signal processors), but also by hardware components, some combination thereof, or even a distributed architecture with individual elements physically separated but cooperating to achieve the same functionality. Thus, it should be understood that the invention is not limited by the foregoing description of preferred embodiments, but embraces all such alterations, modifications, and variations in accordance with the spirit and scope of the appended claims.

We claim:

1. A system for communicating data with a user device comprising:
   a host server for which the user device is a client;
   a communications server, in communication with the host server, comprising a virtual session manager adapted to control communication of data between the user device and host server by communicating the data via a sessionless-oriented communication protocol over a first communication channel between the virtual session manager and the user device, and by sending a registration message from the communications server to the host server registering the user device with the host server as a client of the host server, and thereby establishing a session between the virtual session manager and the host server and communicating the data via a session-oriented communication protocol between the virtual session manager and the host server; and
   a base station, in communication with the communications server via a first portion of the first communication channel and in communication with the user device via a wireless communication channel portion of the first communication channel.

2. The system of claim 1, wherein the host server is an electronic mail post office operating on a host processor, and the host processor is in communication with the communications server via a local area network (LAN) communication channel.

3. The system of claim 1, wherein the host server is a host client-server program operating on a host processor, and the host processor is in communication with the communications server via a wide area network (WAN) communication channel.

4. The system of claim 1, wherein the base station is adapted for communicating over the wireless communication channel portion via a first wireless communication protocol, the system further comprising:
   a further base station, in communication with the communications server via a first portion of a second communication channel and in communication with a second user device via a wireless communication channel portion of the second communication channel;
   wherein the virtual session manager is further adapted to control communication of further data between the second user device and the host server by communicating the data via a further sessionless-oriented communication protocol over the second communication channel between the virtual session manager and the second user device, and by communicating the further data via the session-oriented communication protocol between the virtual session manager and the host server.

5. The system of claim 1, wherein the host server and communications server are different programs operating on a same host processor.

6. The system of claim 1, wherein the host server is one of the group consisting of an electronic mail post office, a client-server host, a multimedia application host, and a voice processor.

7. The system of claim 1, wherein the communications server further comprises a user parameter memory coupled to the virtual session manager, adapted to store user parameters, wherein the virtual session manager is further adapted to control communication of data between the user device and host server based on the user parameters.

8. The system of claim 1, wherein the communications server further comprises:
   a timer, coupled to the virtual session manager, to terminate communications between the user device and host server via the virtual session manager when no data is communicated between the user device and the virtual session manager for more than a predetermined period of time.

9. A method of communicating data between a first data processing device and a second data processing devicecomprising:

(a) sending a message from the first data processing device to a third data processing device via a base station and via a sessionless-oriented communication protocol, thereby establishing a virtual communication session between the first data processing device and the third data processing device;

(b) from the third data processing device, registering the first data processing device with the second data processing device, thereby establishing a communication session between the second data processing device and the third data processing device; and (c) communicating data between the first and second data processing devices by communicating the data via the sessionless-oriented communication protocol over a first communication channel between the first and third data processing devices, and by communicating the data via a session-oriented communication protocol over a second communication channel between the second and third data processing devices, Wherein the first communications channel has a wireless portion between the first communication device and the base station.

10. A method of communicating data between a first data processing device and a second data processing device comprising:

(a) establishing a virtual communication session between the first data processing device and a third data processing device, and establishing a communication session between the second data processing device and the third data processing device;

(b) communicating data between the first and second data processing devices by communicating the data via a base station and via a sessionless-oriented communication protocol over a first communication channel between the first and third data processing devices, and by communicating the data via a session-oriented communication protocol over a second communication channel between the second and third data processing devices wherein:

the first data processing device is a first user device, the second data processing device is a host server, the third data processing device is a communications server, and the first communications channel has a wireless portion between the first communication device and the base station; and step (a) comprises qualifying the user device with the communications server by registering the user device with the communications server, and sending a registration message from the communications server to the host server registering the user device with the host server.

11. The method of claim 10, wherein the step of registering includes authenticating the user device.

12. The method of claim 10, further comprising:

(c) maintaining the virtual communication session for a predetermined period of time following step (b), and maintaining the communication session for at least the duration of the virtual communication session.

13. The method of claim 12, further comprising:

(d) maintaining the virtual communication session by communicating further data, prior to expiration of the predetermined period of time, between the first and third data processing devices via the first communication channel.

14. The method of claim 12 further comprising:

(d) ending the virtual communication session when no further data has been communicated between the first and third data processing devices prior to expiration of the predetermined period of time.

15. The method of claim 10, wherein:

the step of communicating data between the communications server and the user device comprises communicating the data via a wireless communication channel and the data is one of a group consisting of an email message, a text file, a database file, a graphics file, a voice file, and a control message.

16. Communications apparatus adapted for communicating with a host server and a user device comprising a communications server coupled to a radio base station, the communications server including a processor, comprising:

a user parameter memory adapted to store user parameters; and a virtual session manager, coupled with the user parameter memory, adapted to control communication of data between the user device and the host server based on the user parameters by sending a registration message from the communications server to the host server for registering the user device with the host server, thereby establishing a session between the virtual session manager and the host server and communicating the data via a sessionless-oriented communication protocol over a first communication channel between the virtual session manager and the user device, wherein the first communications channel has a wireless portion between the user device and the base station, and by communicating the data via a session-oriented communication protocol over a second communication channel between the virtual session manager and the host server, the virtual session manager also including a query manager for sending query messages to the host server on behalf of the user device and for replicating received messages to the client.

17. The communications apparatus of claim 16, further comprising:

a timer, coupled to the virtual session manager, to terminate communications between the user device and host server via the virtual session manager when no data is communicated between the user device and the virtual session manager for more than a predetermined period of time.

18. A method of communicating data between a client communications device and a communications server comprising:

(a) sending a first message from the client communications device over a wireless channel via a base station to a virtual session manager using a sessionless-oriented protocol;

(b) responsive to the first message, sending a registration message from the virtual session manager to the communications server;

(c) responsive to the registration message, (I) authenticating the client communications device at the communications server, (ii) establishing a session between the virtual session manager and the communications server, and (iii) sending a response message to the client communications device using the sessionless-oriented protocol, thereby establishing a virtual session between the client communications device and the virtual session manager; and (d) communicating data between the client communications device and the communications server by communicating the data via the sessionless-oriented communication protocol over the wireless channel between the client communications device and the virtual session manager, and by communicating the data via a session-oriented communication protocol between the virtual session manager and the communications server.

19. The method of claim 18 further comprising querying the communications server from the virtual session manager until the virtual session is no longer active.

* * * * *

(12) EX PARTE REEXAMINATION CERTIFICATE (7815th)
United States Patent
Eggleston et al.

(10) Number: US 5,771,353 C1
(45) Certificate Issued: Oct. 19, 2010

(54) SYSTEM HAVING VIRTUAL SESSION MANAGER USED SESSIONLESS-ORIENTED PROTOCOL TO COMMUNICATE WITH USER DEVICE VIA WIRELESS CHANNEL AND SESSION-ORIENTED PROTOCOL TO COMMUNICATE WITH HOST SERVER

(75) Inventors: Gene Eggleston, Cary, IL (US); Mitch Hansen, Fox River Grove, IL (US)

(73) Assignee: Motorola, Inc., Schaumburg, IL (US)

Reexamination Request:
No. 90/010,370, Jan. 16, 2009

Reexamination Certificate for:
Patent No.: 5,771,353
Issued: Jun. 23, 1998
Appl. No.: 08/557,657
Filed: Nov. 13, 1995

(51) Int. Cl.
H04L 12/58 (2006.01)
H04L 29/06 (2006.01)
H04L 12/28 (2006.01)
H04L 12/56 (2006.01)
H04L 29/08 (2006.01)

(52) U.S. Cl. .................................... 709/227; 709/228
(58) Field of Classification Search .................. None
See application file for complete search history.

(56) References Cited

U.S. PATENT DOCUMENTS

| 5,559,800 A | 9/1996 | Mousseau et al. |
| 5,742,905 A | 4/1998 | Pepe et al. |
| 5,850,517 A | 12/1998 | Verkler et al. |

OTHER PUBLICATIONS

M. Khan and J. Kilpatrick, "MOBITEX and Mobile Data Standards", IEEE Commun. Mag., vol. 33, No. 3, pp. 96–101. Mar. 1995.*
RFC 918, Post Office Protocol. Oct. 1981.*
RFC 821, Simple Mail Transfer Protocol. Aug. 1982.*
Oracle, Corp. Oracle7 Server Concepts, Release 7.3. White Paper, Feb. 1996.*
Cisco Systems, Inc. Internetworking Technology Handbook, Chap. 17. White Paper, 1992–1998.*
Oracle Corp., *Oracle Mobile Agents: Technical Product Summary*, White Paper, Mar. 1995.

* cited by examiner

*Primary Examiner*—Zoila E Cabrera

(57) ABSTRACT

A communication system includes a virtual session manager (225) for establishing and maintaining a sessionless communication path with a user device (201) on the one hand and a session-oriented communication path with a host system (231). The session-oriented connection with the host system permits normal access to, e.g., LAN-based applications, while the virtual session between the virtual session manager and user permits this access to be carried out remotely without the expense of a dedicated/circuit-switched or other session-oriented connection.

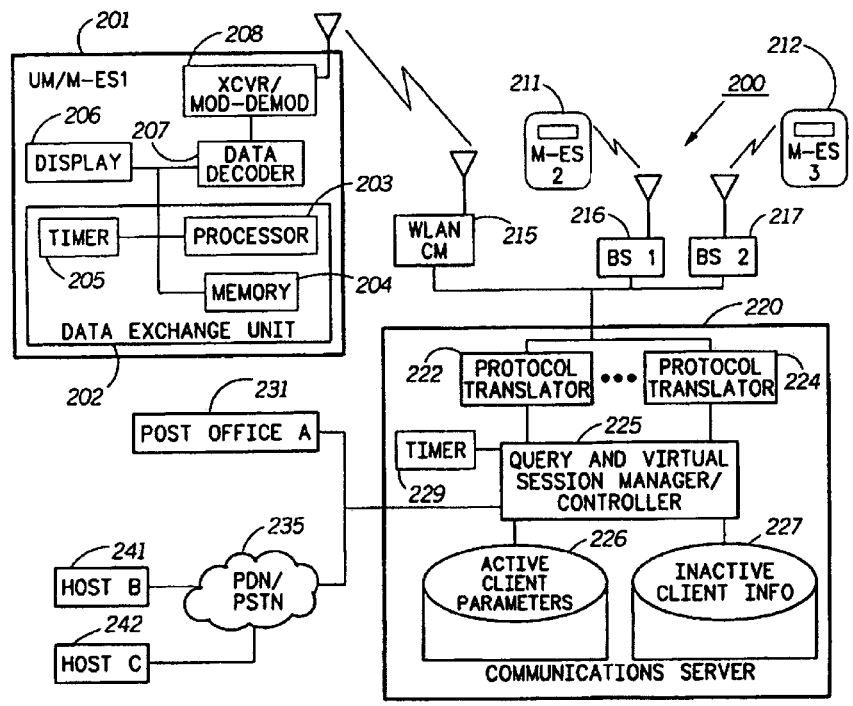

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-2 and 5-19 is confirmed.

Claims 3-4 were not reexamined.

* * * * *